P. W. MACKENZIE.

Montpelier Manufacturing Co., Assignees by mesne Assignments.

VELOCIPEDES.

No. 7,818. Reissued July 31, 1877.

Witnesses:

Chas. Nida

H. L. Mattenberg

Philip W. Mackenzie
Inventor:
Montpelier Manfg. Co.
Assignee
per [illegible]
Atty

N. PETERS, PHOTO-LITHOGRAPHER, WASHINGTON, D. C.

UNITED STATES PATENT OFFICE.

MONTPELIER MANUFACTURING COMPANY, OF MONTPELIER, VERMONT, ASSIGNEES, BY MESNE ASSIGNMENTS, OF PHILIP W. MACKENZIE.

IMPROVEMENT IN VELOCIPEDES.

Specification forming part of Letters Patent No. 41,310, dated January 19, 1864; Reissue No. 7,818, dated July 31, 1877; application filed July 6, 1877.

*To all whom it may concern:*

Be it known that PHILIP W. MACKENZIE, of Jersey City, in the county of Hudson and State of New Jersey, did invent certain new and useful Improvements in Velocipedes; and that the following is a full, clear, and exact description of the same, reference being had to the accompanying drawings, and to the letters of reference marked thereon, making part of this specification.

This invention is in the nature of an improvement in velocipedes.

The invention consists in a velocipede with the supports for the rider, whether in the shape of a horse or otherwise, rigid in all its parts, with its front and rear portions supported on wheels, with cranks on the front shaft or axle, which are to be operated by the feet of the rider, said cranks being provided with loosely-fitting rests for the feet, which rests are supported solely by such cranks, and are disconnected from treadle-levers or gears, so that the feet of the rider may come in direct contact with such feet-rests without the intervention of other mechanism; and the invention further consists in a velocipede, the fore part of the body thereof resting on a crank pin or shaft, so that, if desired, the body of the horse or support may have an up-and-down motion, and thereby assist in propelling the vehicle.

The connecting of bit and bridle or handle with the steering wheel or wheels behind is made direct, bringing a part of the connecting-rods within the body, making the steering arrangement very simple and reliable, and not likely to get out of order. The bit with bridle attached is placed in the supporting-horse's mouth, or other device, but may be placed farther back in the head or in the neck, and a wooden or other handle attached; but this arrangement is the most natural, and of course the most desirable mode of guiding a horse. The connecting-rods are crossed to obtain another natural movement—the pulling of the rein on the side the rider wishes to go. A friction-plate is arranged to press against the hub of one wheel, and so adjusted as to compensate in turning short curves. When intended for use where there is ample space, both front wheels are firmly secured to the shaft.

Figure 1:
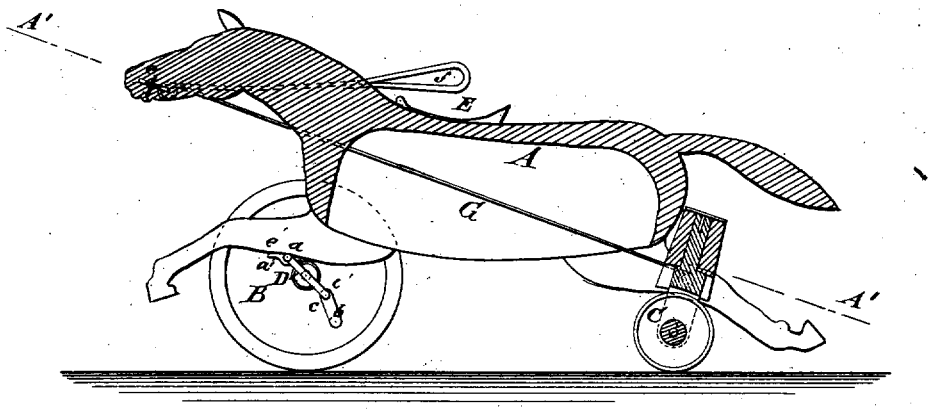
Figure 2:
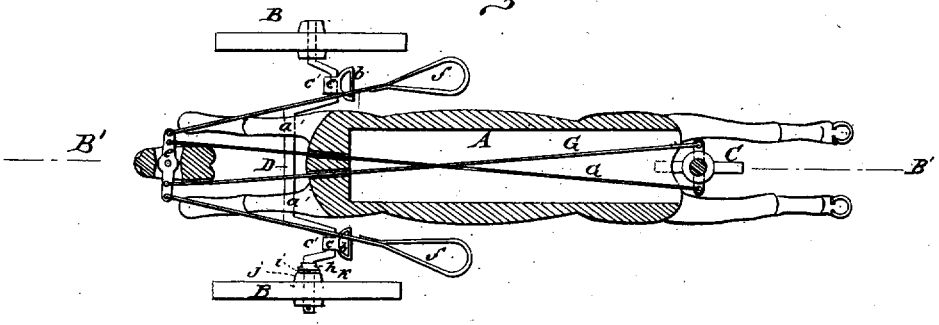

In the accompanying sheet of drawings, Figure 1 is an elevated section through the line B′ B′, Fig. 2, and Fig. 2 is a horizontal view with the upper portion of the head and body removed to the line A′ A′, Fig. 1.

Similar letters of reference indicate like parts in both figures.

A is the body; B, driving-wheels; C, steering-wheel; D, crank-shaft; E, seat; *a′*, crank-pin; *a*, bearing connecting body and crank-pin *a′*; *b b*, stirrups or foot bearings; *c*, connection of stirrups or foot-bearings on crank-pin *c′ c′*. *e* is the bit; *f*, the bridle; G G, connecting-rods connecting the bit with the steering-wheel behind. *h* is a collar firmly secured to the shaft. *i* is rubber or other elastic substance; *j*, friction-plate; *k*, hub of wheel.

Its operation is as follows: The rider mounts the seat E, the weight bringing the crank-pin *a′* to the lower position. The feet are then placed in the stirrups *b*, the bridle *f* is grasped by the hand, and an attempt made to rise in the stirrups, which throws the weight upon the crank-pin *c′*, relieves the pressure upon the crank-pin *a′*, and produces a propelling power and onward motion, giving a graceful rise and fall to the horse. In guiding, the rein is drawn on the side the rider wishes to go; if to the right, the connecting-rod on the left crossing over to the right side of the wheel behind, throwing the front part of wheel to the left, causing the back part of the carriage to take that direction, thereby turning the head to the right.

When turning short curves the hub *k* will slip on the friction-plate *j*, relieving the strain on shaft, and allowing the face of wheel to travel to correspond with the difference from center of motion.

The collar *h* may be secured to the hub of the wheel, and the face of the wheel slip in turning slight curves.

What we claim as the invention of the said PHILIP W. MACKENZIE is—

1. A velocipede constructed with cranks having feet-rests loosely fitted on the crank-pins thereof, and supported solely by said crank-pins, which feet-rests are adapted to receive the rider's feet directly and without the intervention of treadles or of other mechanism.

2. A rigid auto-propelling horse or other seat for a rider, in combination with and connected directly to a shaft having two or more cranks.

3. The stirrups *b* or foot-rests, arranged directly on the crank-pin opposite the one on which the body rests, in combination with the cranked axle and body.

4. The arrangement of the friction-plate *j*, the elastic *i*, and the collar *h*, in combination with the cranked axle and body.

MONTPELIER MFG. CO.,
By JAMES W. BROCK, *Vice Prest.*

Witnesses:
JAMES S. PECK,
R. F. FIFIELD.